United States Patent [19]

McGee et al.

[11] Patent Number: 5,380,464
[45] Date of Patent: Jan. 10, 1995

[54] SILICONE FOAM CONTROL COMPOSITION

[75] Inventors: James B. McGee, Midland County; Lenin J. Petroff, Bay County, both of Mich.; Koichi Aizawa, Kamakura; Hiroaki Shoji, Minamiasigara, both of Japan

[73] Assignee: Dow Corning Corporation, Midland, Mich.

[21] Appl. No.: 479,022

[22] Filed: Feb. 12, 1990

Related U.S. Application Data

[63] Continuation-in-part of Ser. No. 393,620, Aug. 14, 1989, abandoned, which is a continuation-in-part of Ser. No. 192,042, May 9, 1988, abandoned.

[51] Int. Cl.⁶ .................. B01D 19/04; C08K 3/36
[52] U.S. Cl. .................................. 252/321; 252/358
[58] Field of Search ......................... 252/321, 358

[56] References Cited

U.S. PATENT DOCUMENTS

| | | | |
|---|---|---|---|
| 3,713,851 | 1/1973 | Cekada, Jr. | 106/38.22 |
| 3,784,479 | 1/1974 | Keil | 252/358 |
| 3,912,652 | 10/1975 | Colquhoun | 252/358 |
| 3,984,347 | 10/1976 | Keil | 252/321 |
| 4,076,648 | 2/1978 | Rosen | 252/358 |
| 4,395,352 | 7/1983 | Kulkarni et al. | 252/321 |
| 4,460,493 | 7/1984 | Lomas | 252/321 |
| 4,639,489 | 1/1987 | Aizawa et al. | 524/588 |
| 4,690,713 | 9/1987 | Terae et al. | 252/358 X |
| 4,741,861 | 5/1988 | Okada et al. | 252/358 |
| 4,749,740 | 6/1988 | Aizawa et al. | 524/588 |
| 4,762,640 | 8/1988 | Schiefer | 252/321 |
| 4,978,471 | 12/1990 | Starch | 252/321 X |
| 4,983,316 | 1/1991 | Starch | 252/321 X |

FOREIGN PATENT DOCUMENTS

| | | |
|---|---|---|
| 75771-87 | 1/1988 | Australia . |
| 1040964 | 10/1978 | Canada . |
| 0142910 | 5/1985 | European Pat. Off. . |
| 139107 | 10/1981 | Japan . |
| 60-156513 | 8/1985 | Japan . |

OTHER PUBLICATIONS

Derwent Abstract, 85-239868/39.

Primary Examiner—Robert L. Stoll
Assistant Examiner—Daniel S. Metzmaier
Attorney, Agent, or Firm—Alexander Weitz; Timothy J. Troy

[57] ABSTRACT

There is disclosed a foam control composition comprising (I) a silicone defoamer reaction product and (II) a silicone glycol copolymer, which composition is particularly effective in defoaming highly acidic or highly basic aqueous systems. Component (I) is prepared by heating a mixture of (i) a polyorganosiloxane fluid, (ii) a resinous silicon compound, (iii) a finely divided filler and (iv) a catalytic amount of a compound for promoting the reaction of the other components at a temperature of 50° C. to 300° C.

40 Claims, No Drawings

SILICONE FOAM CONTROL COMPOSITION

This is a continuation-in-part of copending application Ser. No. 07/393,620, filed on Aug. 14, 1989, now abandoned, which is a continuation-in-part of Ser. No. 07/192,042, filed on May 9, 1988, now abandoned.

BACKGROUND OF THE INVENTION

This invention relates to a foam control composition for use in aqueous foaming systems. More particularly, this invention relates to a composition comprising a mixture of a silicone defoamer reaction product and a silicone glycol which is especially useful in controlling foam in highly acidic or highly basic systems operating at elevated temperatures.

The use of various silicone containing compositions as antifoams or defoamers is known. In this regard, it is well established that this art is highly unpredictable and slight modification can greatly alter performance of such compositions. Most of these compositions contain silicone fluid (usually dimethylpolysiloxane), often in combination with small amounts of silica filler. Additionally, these compositions may include various surfactants and dispersing agents in order to impart improved foam control or stability properties to the compositions.

Thus, for example, Rosen, in U.S. Pat. No. 4,076,648, teaches self-dispersible antifoam compositions consisting essentially of a lipophilic nonionic surface active agent homogeneously dispersed in a non-emulsified diorganopolysiloxane antifoam agent. This combination is said to promote dispersibility in water without the need for emulsification.

Kulkarni et al., in U.S. Pat. No. 4,395,352, improved upon the compositions disclosed by Rosen, cited supra, by limiting the viscosity of the dimethylpolysiloxane oil therein to the range of 5,000 to 30,000 cS at 25° C. Such a limitation, it is taught, unexpectedly resulted in improved efficiency in difficult-to-defoam aqueous systems, such as those which contain high concentrations of ionic surfactants and those which are very viscous.

Keil, in U.S. Pat. No. 3,784,479, discloses foam control compositions which consist essentially of a base oil selected from polyoxypropylene polymers, polyoxypropylenepolyoxyethylene copolymers or siloxane-glycol copolymers, a foam control agent, comprising a liquid dimethylpolysiloxane and silica filler, and a dispersing agent which consists of a copolymer of a siloxane resin and a polyoxyalkylene polymer. The contribution to the art in this case is stated to be improved compatibility with otherwise desirable diluents without resorting to emulsifying the foam control agent in water.

In a closely related patent, U.S. Pat. No. 3,984,347, Keil discloses foam control compositions which consist essentially of a base oil selected from polyoxypropylene polymers, polyoxypropylene-polyoxyethylene copolymers or siloxane-glycol copolymers, a foam control agent comprising a liquid dimethylpolysiloxane and silica filler and a siloxane copolymer dispersing agent. This time the dispersing agent consists of a copolymer of a dimethylpolysiloxane polymer and a polyoxyalkylene polymer. The same advantages as reported for U.S. Pat. No. 3,784,479, cited supra, were obtained.

A composition suitable for use as a defoamer in dyeing operations is taught by Colquhoun in U.S. Pat. No. 3,912,652. In this case, the composition consists of a copolymer of a dimethylpolysiloxane polymer and a polyoxyalkylene polymer combined with a lesser amount of a copolymer of a siloxane resin and a polyoxyalkylene polymer. Such compositions are stated to be particularly useful in jet dyeing operations since they are compatible with the dye carriers employed therein.

Japanese O.P.I. No. 139,107/81, published Oct. 30, 1981, teaches a self-emulsifying type defoaming agent which is said to have excellent foam-suppressing and breaking capability regardless of temperature and pH of a liquid to be treated and the storage period to which it is subjected. This agent is composed of a silicone copolymer having diorganosiloxane and organo-oxyalkylenesiloxane units in the copolymer chain.

A process for control of foaming in non-aqueous systems is disclosed by Lomas in U.S. Pat. No. 4,460,493. The compositions employed consist essentially of (1) at least one foam control agent, selected from polydimethylsiloxane or poly(methyl-3,3,3-trifluoropropyl)siloxane, which may optionally include a minor portion of a siloxane resin, (2) a dispersing agent of the type described in the patents to Keil, cited supra, and (3) a non-ionic surfactant having an HLB number greater than 10. This invention is said to provide an effective and cost efficient foam control method for the non-aqueous systems described. A similar composition containing a high molecular weight polydimethylsiloxane was also shown to be useful in defoaming highly acidic aqueous systems by Schiefer in copending application Ser. No. 940,686, filed Dec. 11, 1986, now U.S. Pat. No. 4,762,640.

Aizawa et al., in U.S. Pat. No. 4,639,489 and copending application Ser. No. 930,611 filed on Nov. 14, 1986, now U.S. Pat. No. 4,749,740, the disclosures of which are hereby incorporated by reference, teach a method for producing a silicone defoamer composition wherein a complex mixture of polyorganosiloxanes, filler, a resinous siloxane and a catalyst to promote reaction of the other components are heated together at 50° C. to 300° C.

More recently, a method for preparing a composition similar to that described by Aizawa et al., cited supra, was disclosed in Australian Patent Application No. 75771/87, published on Jan. 21, 1988 and assigned to Dow Corning KK. In this disclosure, the abovementioned complex silicone mixture additionally contains at least 0.2 weight parts of an organic compound having at least one group selected from ≡COR, —COOR' or —(OR")$_n$—, wherein R and R' are hydrogen or a monovalent hydrocarbon group, R" is a divalent hydrocarbon group having 2 to 6 carbon atoms and the average value of n is greater than one. In this disclosure the inventor, T. Miura, emphasizes the need to react all the ingredients, including a catalyst, at elevated temperature to obtain the desired antifoam agent.

SUMMARY OF THE INVENTION

It has now been found that antifoam compositions disclosed by Aizawa et al., cited supra, can be advantageously utilized to defoam acidic or basic aqueous systems at elevated temperatures when these compositions are mixed with critical amounts of particular silicone glycols. When the foam control compositions of the present invention are used, aqueous media having a pH as low as 1 or as high as 14 and a temperature as high as 100° C. are defoamed for longer time periods than when antifoams of the prior art are employed. This invention thus relates to a foam control composition comprising:

(I) a silicone defoamer reaction product prepared by reacting at a temperature of 50° C. to 300° C.:

(i) 100 parts by weight of at least one polyorganosiloxane selected from the group consisting of (A) a polyorganosiloxane having a viscosity of about 20 to 100,000 cS at 25° C. and being expressed by the general formula $R^1_aSiO_{(4-a)/2}$ in which $R^1$ is a monovalent hydrocarbon or halogenated hydrocarbon group having 1 to 10 carbon atoms and a has an average value of 1.9 to 2.2 and (B) a polyorganosiloxane having a viscosity of 200 to about 100 million cS at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, said —$OR^3$ group being present at least at the end of a molecular chain; (ii) 0.5 to 20 parts by weight of at least one resinous silicon compound selected from the group consisting of (a) an organosilicon compound of the general formula $R^4_dSiX_{4-d}$ in which $R^4$ is a monovalent hydrocarbon group having 1 to 5 carbon atoms, X is a hydrolyzable group and d has an average value of one or less, (b) a partially hydrolyzed condensate of said compound (a), (c) a siloxane resin consisting essentially of $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, and (d) a condensate of said compound (c) with said compound (a) or (b); (iii) 0.5 to 30 parts by weight of a finely divided filler; (iv) a catalytic amount of a compound for promoting the reaction of the other components; and (II) from about 20 to 200 parts by weight for each 100 parts by weight of said silicone defoamer reaction product (I) of a silicone-glycol copolymer having the average general formula

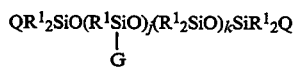

wherein $R^1$ has been previously defined, Q is $R^1$ or G, j has a value of 1 to about 150, k has a value of 0 to about 400 and G is a polyoxyalkylene group having the average structure

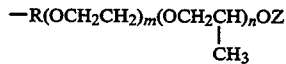

in which R is a divalent hydrocarbon group having 2 to 20 carbon atoms, m has a value of 4 to about 50, n has a value of 0 to about 50 and Z is selected from the group consisting of hydrogen, an alkyl radical having 1 to 6 carbon atoms and an acyl group having 2 to 6 carbon atoms. The present invention further relates to a process for controlling foam in an aqueous foaming system which includes the addition of a foam control agent to said system, the improvement comprising using the above described composition as the foam control agent.

DETAILED DESCRIPTION OF THE INVENTION

The compositions of this invention comprise (I) a silicone defoamer reaction product prepared according to the disclosures of Aizawa et al., cited supra, and from about 20 to 200 parts by weight of (II) a silicone glycol for each 100 parts by weight of (I).

Component (I) of the present invention is a reaction product of (i) a polyorganosiloxane, (ii) a resinous silicon compound, (iii) a finely divided filler and (iv) a catalytic amount of a compound for promoting the reaction of the other components.

Component (i) may be selected from (A) polyorganosiloxanes expressed by the general formula $R^1_aSiO_{(4-a)/2}$ and having a viscosity of 20 to 100,000 centistokes (cS) at 25° C. The organo groups $R^1$ of the polyorganosiloxane (A) are the same or different monovalent hydrocarbon or halogenated hydrocarbon groups having one to ten carbon atoms. Specific examples thereof are well known in the silicone industry and include methyl, ethyl, propyl, butyl, octyl, trifluoropropyl, phenyl, 2-phenylethyl and vinyl groups. The methyl group is particularly preferred. In the above formula, a has a value of 1.9 to 2.2. It is particularly preferred that polyorganosiloxane (A) is a trimethylsilyl-terminated polydimethylsiloxane having a viscosity of about 350 to 15,000 cS at 25° C.

Alternatively, component (i) may be selected from (B) polyorganosiloxanes expressed by the general formula $R^2_b(R^3O)_cSiO_{(4-b-c)/2}$ and having a viscosity of 200 to 100 million centistokes at 25° C. wherein $R^2$ is independently selected from the monovalent hydrocarbon or halogenated hydrocarbon groups designated for group $R^1$, $R^3$ is a hydrogen atom or $R^2$, and the —$OR^3$ group is present at least at the end of a molecular chain of polyorganosiloxane. The value of b is between 1.9 to 2.2 and c is has a value so as to provide at least one —$OR^3$ group per molecule. It is particularly preferred that polyorganosiloxane (B) is a hydroxyl-terminated polydimethylsiloxane having a viscosity of about 1,000 to 50,000 cS at 25° C. Component (i) may also be a mixture of (A) and (B) in any proportion.

Component (ii) is at least one resinous silicon compound selected from (a) to (d): (a) An organosilicon compound of the general formula $R^4SiX_{4-d}$ wherein $R^4$ is a monovalent hydrocarbon group having one to five carbon atoms, X is a hydrolyzable group, such as —$OR^5$ or —$OR^6OR^7$, in which $R^6$ is a divalent hydrocarbon group having one to five carbon atoms and $R^5$ and $R^7$ are each hydrogen or a monovalent hydrocarbon group having one to five carbon atoms. The average value of d does not exceed 1. (b) A partially hydrolyzed condensate of the compound (a), (c) A siloxane resin consisting essentially of $(CH_3)_3SiO_{1/2}$ and $SiO_2$ units and having a $(CH_3)_3SiO_{1/2}/SiO_2$ ratio of 0.4/1 to 1.2/1.

(d) A condensate of the siloxane resin (c) with the compound (a) or (b).

It is preferred that component (ii) is selected from either an alkyl polysilicate wherein the alkyl group has one to five carbon atoms, such as methyl polysilicate, ethyl polysilicate and propyl polysilicate, or the siloxane resin (c). Most preferably, component (ii) is either ethyl polysilicate or a siloxane resin copolymer consisting essentially of $(CH_3)_3SiO_{1/2}$ units and $SiO_2$ units in a molar ratio of approximately 0.75:1.

Component (iii) is a finely divided filler such as fume $TiO_2$, $Al_2O_3$, $Al_2O_3/SiO_2$, $ZrO_2/SiO_2$ and $SiO_2$. Various grades of silica having a particle size of several millimicrons to several microns and a specific surface area of about 50 to 1000 $m^2/g$ are commercially available an suitable for use as component (iii). Preferably, the filler is selected from silicas having a surface area of about 50 to 300 m²/g.

Component (iv) is a compound used as a catalyst for promoting the reaction of the other components. It is preferably selected from siloxane equilibration and/or silanol-condensing catalysts such as alkali metal hydroxides, alkali metal silanolates, alkali metal alkoxides, quaternary ammonium hydroxides and silanolates, quaternary phosphonium hydroxides and silanolates and metal salts of organic acids. It is preferred that the catalyst is potassium silanolate.

For the purposes of the present invention, the silicone defoamer reaction product (I) may optionally contain component (v), a polyorganosiloxane expressed by the general formula $R^8_e(R^9O)_f SiO_{(4-e-f)/2}$ and having a viscosity of 5 to 200 cS at 25° C. wherein $R^8$ is a monovalent hydrocarbon or halogenated hydrocarbon group having one to ten carbon atoms and $R^9$ is hydrogen or a monovalent hydrocarbon group having one to ten carbon atoms. The value of e is between 1.9 and 2.2 and f has a value so as to provide two or more $—OR^9$ groups in each molecule. It is particularly preferred that component (v) is a hydroxyl-terminated polydimethylsiloxane having a viscosity of about 10 to 50 cS at 25° C. It is preferred that component (v) is added when filler (iii) is a hydrophilic silica.

A mixture of components (i) to (iv), optionally containing component (v), is reacted under heat to produce the silicone defoamer reaction product (I), the proportions of the various components being:

Component (i) - 100 parts by weight;
Component (ii) - 0.5 to 20, preferably 1 to 7, parts by weight;
Component (iii) - 0.5 to 30, preferably 1 to 7, parts by weight;
Component (iv) - A catalytic amount (usually in the range of 0.03 to 1 part by weight;
Component (v) - 0 to 20, preferably 1 to 10, parts by weight. The proportions of components (A) and (B) used depends largely on their respective viscosities. It is preferable to use a mixture of (A) and (B) which has a viscosity of 1,000 to 100,000 cS at 25° C.

The silicone defoamer reaction product (I) is prepared by first mixing components (i) and (ii) and heating this blend to about 110° to 120° C. and then adding catalyst (iv). Finely divided filler (iii) is then uniformly mixed in using an appropriate dispersing device, such as a homomixer, colloid mill or triple roll mill. The resulting mixture is heated at a temperature of 50° C. to 300° C., preferably 100° C. to 300° C., and reacted for one to eight hours, although the reaction time varies depending on the temperature. If component (v) is to be employed in the composition, it is generally added after the filler (iii). It is preferable to carry out all mixing and heating operations in an inert gas atmosphere in order to avoid any danger and to remove volatile matter (unreacted matter, by-products, etc.). The mixing order of the components and the heating temperature and time as hereinabove stated are not believed critical, but can be changed as required. It is further preferred that, after reaction, the catalyst is neutralized to further stabilize the silicone defoamer reaction product (I).

Component (II) of the present invention is a silicone glycol having the average general formula

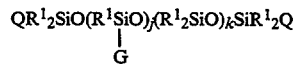

wherein $R^1$ has been defined above, Q is $R^1$ or G, j has a value of 1 to about 150, and k has a value of 0 to about 400. In the above formula, G is a polyoxyalkylene group having the average structure

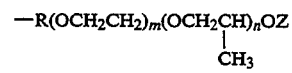

in which R is a divalent hydrocarbon group having 2 to 20 carbon atoms, m has a value of about 4 to about 50 and Z is selected from the group consisting of hydrogen, an alkyl radical having 1 to 6 carbon atoms and an acyl group having 2 to 6 carbon atoms. For the purposes of the present invention, n is zero or has a value, such as 1 to about 50. Preferably, n has some small finite value in order to qualify the resulting foam control compositions for use in indirect food contact antifoam applications in pulp mill defoamers. The selection of the parameters j, k, m and n is made with the proviso that the silicone glycol (II) must be water dispersible in a foaming medium (i.e., the silicone glycol does not phase separate on standing after being thoroughly mixed with the medium). Generally, it is preferred that the ratio j:k is one or less and j=1 when k is zero. Thus, for example, when the value of j is at least 10% of the value of k, the silicone glycol is generally dispersible in water. With this proviso in mind, it is preferred that both Q and $R^1$ of component (II) are methyl radicals and that R is the trimethylene or isobutylene group. It is further preferred that j is 1 to 20, k is 0 to 200, m is 4 to 50, and n is less than or equal to m. In highly preferred embodiments, j is between 1 and 10, k is between 0 and 100 and m is between 7 and 12. Although somewhat inferior in performance, solid compositions of the present invention may be formed when m is sufficiently large (e.g., m=24).

It has been found that, in particular foaming systems, the above mentioned dispersibility may be improved by preferably employing two different silicone-glycol copolymers, as illustrated in Examples 27 to 29, infra.

The silicone glycols (II) are well known in the art, many of these being available commercially, and further description thereof is considered unnecessary.

The compositions of the present invention preferably also contain (III) a finely divided filler, as described above for component (iii). Addition of such a filler has been found to impart an increased measure of stability to the compositions since compositions consisting of only Components (I) and (II) tend to phase separate on standing at ambient conditions even though these compositions do provide enhanced antifoam performance. Specific examples of this filler include zirconium silica hydrogels (co-precipitated zirconium and silica) and hydrophilic or hydrophobic precipitated silica, the latter being highly preferred.

The compositions of the present invention may further optionally contain (IV) a polyorganosiloxane of the type described for component (i), supra. Addition of this ingredient also confers added stability with respect to phase separation of components (I) and (II). Preferred polyorganosiloxanes in this regard are selected from the same trimethylsilyl-terminated polydimethylsiloxanes described for the preferred embodiments for (A) and/or (B) of component (i), supra. In this case, the preferred viscosity ranges of (A) and (B) are 2 to 100 cS and 150 to 100,000 cS, respectively. Particularly preferred viscosity ranges of these components are 10 to 50 cS for (A) and 500 to 2,000 cS for (B), the above viscosities being measured at 25° C.

In addition to the above mentioned components, the foam control agents of the present invention may also contain adjuvants such as corrosion inhibitors and dyes.

The foam control agents of the present invention may be prepared by thoroughly mixing, without heating or further catalysis, 100 parts by weight of the silicone defoamer reaction product (I) with 20 to 200 parts by weight, preferably about 100 parts, of the silicone glycol (II). Preferably, from 1 to 15 parts by weight of the finely divided filler (III) is also uniformly dispersed in the above mixture of components (I) and (II). This may be accomplished by any convenient mixing method known in the art such as a sigma blade mixer, planetary mixer or other suitable mixer. Although the order of mixing is not considered critical, it is preferred to first mix components (I) and (II) and then disperse the finely divided filler (III) in this combination by using a high shear mixer. If the optional polyorganosiloxane (IV) is to be included in the composition, it is generally added at a level of about 10 to 100 parts by weight.

The present invention also relates to a process for controlling foam in an aqueous foaming system wherein the above-described foam control agents may simply be added to an acidic, basic or neutral aqueous foaming (or foam-producing) system. Typically, the foam control agents of the present invention are added at a concentration of about 0.001 to 0.1 percent based on the weight of the foaming system. However, the skilled artisan will readily determine optimum concentrations after a few routine experiments. The method of addition is not critical, and the foam control agent may be metered in or added by any of the techniques known in the art. Examples of acidic foaming systems contemplated herein include media encountered in the production of phoshoric acid and in sulphite process pulping operations. Basic systems include bauxite digestion medium in the production of aluminum, inter alia. An example of a neutral system is a metal working fluid.

It has been found that the foam control agents of the present invention offer particular advantage when the foaming system comprises highly acid or highly basic aqueous environments, such as those having a pH of less than about 3 or greater than about 12. This holds particularly for highly acidic or basic systems at elevated temperatures. Thus, for example, under the extremely harsh conditions encountered in paper pulp manufacture, wherein the aqueous foaming medium (kraft process "black liquor") has a pH of 12 to 14 and a temperature of 50° C. to 100° C., the compositions of the present invention have been found to provide defoaming activity for considerably greater time periods than antifoam agents of the prior art (e.g., those disclosed by Kulkarni et al. or those of Aizawa et al., both cited supra).

EXAMPLES

The following examples are presented to further illustrate the compositions of this invention, but are not to be construed as limiting the invention, which is delineated in the appended claims. All parts and percentages in the examples are on a weight basis unless indicated to the contrary.

The following materials were employed in the preparation of the antifoam compositions:

FLUID A

A silicone defoamer reaction product prepared according to Example 1 of U.S. Pat. No. 4,639,489 to Aizawa et al., cited supra. This antifoam contained 60 parts of a trimethylsilyl-terminated polydimethylsiloxane having a viscosity of 1,000 cS at 25° C.; 29 parts of a hydroxyl-terminated polydimethylsiloxane having a viscosity of 12,500 cs at 25° C.; 2.9 parts of ethyl polysilicate ("Silicate 45" of Tama Kagaku Kogyo Co., Ltd., Japan); 4.8 parts of a potassium silanolate catalyst; 2.9 parts of Aerogel #200 silica (Nippon Aerogel Co., Japan) having a surface area of 200 m$^2$/g; and 4.8 parts of hydroxyl-terminated polydimethylsiloxane having a viscosity of 40 cS at 25° C. In addition to the above ingredients, this formulation also included 0.3 parts of ethanol as part of the catalyst, 0.1 part water adsorbed on the silica and 0.1 part of L-540, added as a process dispersant. L-540 (Union Carbide Corp., Danbury, Conn.) is described as a silicone glycol block copolymer wherein the glycol blocks consist of 50/50 mole percent of polyoxyethylene/polyoxypropylene.

FLUIDS B to I

Silicone glycols having the average structure

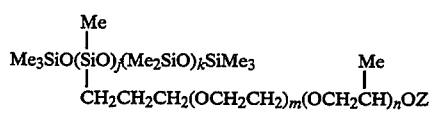

$$Me_3SiO(SiO)_j(Me_2SiO)_kSiMe_3$$
with Me and $CH_2CH_2CH_2(OCH_2CH_2)_m(OCH_2CH)_nOZ$ side groups wherein Me hereinafter denotes a methyl radical and Z, j, k, m and n are defined in the following table

| Ingredient | HLB Value | Z | j | k | m | n |
|---|---|---|---|---|---|---|
| FLUID B | 14 | —H | 1 | 0 | 12 | 0 |
| FLUID C | 7 | —C(O)Me | 2 | 24 | 12 | 0 |
| FLUID D | — | —H | 1 | 0 | 7 | 0 |
| FLUID E | — | —H | 1 | 0 | 24 | 0 |
| FLUID F | — | —H | 4 | 13 | 7 | 0 |
| FLUID G | — | —H | 4 | 13 | 12 | 0 |
| FLUID H | — | —Me | 9.5 | 330.5 | 16 | 22 |
| FLUID I | — | —Me | 7.5 | 332.5 | 16 | 22 |
| FLUID J | 16.5 | —H | 9.5 | 103 | 18 | 18 |
| FLUID K | 7 | —H | 2 | 22 | 11.88 | 0.12 |

QUSO WR55

A hydrophobic precipitated silica having a surface area of 120 square meters per gram obtained from Degussa - Pigments Division, Teterboro, N.J.

Test Method

A defoaming tester similar to that described in U.S. Pat. No. 3,107,519, hereby incorporated by reference, was used to evaluate the antifoaming efficiency of the compositions of the present invention. In brief, this apparatus was designed to recirculate a foaming liquid from the bottom discharge of a partially filled graduated cylinder, through a magnetically-coupled pump and an in-line aspirator, to the top portion of the graduated cylinder, wherein the circulating liquid was caused to splash onto the free surface of the liquid contained in the cylinder. The temperature of the whole system was controlled at 77° C.

The foaming liquid employed in conjunction with the above apparatus was a "kraft process black liquor" obtained from a wood pulp digestion step in the manufacture of paper. This liquor consisted essentially of sodium lignin sulfonate, pentosan sugars, tall oil soaps, sodium carbonate, sodium sulfide and sodium hydroxide dispersed in water. The liquor had a solids content of about 15% and a pH of 13.5 at 20° C.

In practice, the apparatus was flushed with heated tap water until its temperature had equilibrated at 77°±0.1° C., whereupon the system was drained. The cylinder was then filled to a level of 14 cm (400 ml) with the above described foaming liquid which had been preheated to 77° C. When the pump was activated, the liquid level in the cylinder dropped to approximately 11 cm in the cylinder as the foaming liquid filled the pump and lines. Air entrained in the foaming fluid from passing through the aspirator, in addition to the above mentioned splashing action, produced copious foam above the surface of the liquid in the cylinder.

When the total foam height reached a height of 21 cm (i.e., 10 cm of actual foam and 11 cm of liquid), an antifoam composition, in water dispersion form, was injected into the foaming liquid through a rubber tube at the base of the graduated cylinder. Foam height was recorded as a function of time and the "knockdown" and "persistence" characteristics were noted. The knockdown value, which represents the initial rapid reduction of foam height when the antifoam composition was injected into the foaming liquid, is defined herein as the total foam height at a time of ten seconds after injection. The persistence value, which relates to the antifoam's ability to suppress foaming for a given period of time after injection of the antifoam composition, is defined herein as the time at which the total foam height increased beyond its initial height of 21 cm and maintained a height of greater than 21 cm for more than 2 minutes.

Examples 1-3

Antifoam compositions of the present invention were prepared by mixing the components indicated in Table 1 in a ½ ounce vial, wherein a microspatula was used to stir the mixture till a homogeneous dispersion was obtained.

TABLE 1

| Component | Example 1 | Example 2 | Example 3 |
|---|---|---|---|
| Grams of FLUID A | 3.7 | 4.0 | 3.7 |
| Grams of FLUID B | 4.0 | 4.0 | — |
| Grams of FLUID C | — | — | 4.0 |
| Grams of QUSO WR55 | 0.3 | — | 0.3 |

(Comparative) Example 4

FLUID A was dispersed in deionized water according to the formulation recommended by Aizawa et al. at column 8 of U.S. Pat. No. 4,639,489, cited supra:

| | |
|---|---|
| FLUID A | 10.0 parts |
| Polyoxyethylene Monostearate (PLURONIC L101, BASF, Parsippany, NJ) | 1.4 |
| Fatty Acid Ester of Glycerine (MAZOL GMS K, Mazer Chem. Inc., Gurnee, IL) | 1.2 |
| Hydroxylated Cellulose (NATROSOL 250LR, Hercules, Inc., Wilmington, DE) | 1.5 |
| Antiseptic Agent (Benzoic Acid) | 0.1 |
| Water | Balance |
| Total | 100 Parts |

This composition was prepared by first dispersing the NATROSOL 250 LR, MAZOL GMS K and PLURONIC L101 in 38.5 parts of water heated to 70° C. using an Eppenbach mixer. FLUID A was then added and mixed for 30 minutes at 70° C., whereupon the mixture was cooled to 50° C. This combination was further mixed for 30 minutes at 50° C. and the remaining water (47.3 parts) was added. The benzoic acid was finally added and the total antifoam composition cooled under shear to 30° C.

(Comparative) Example 5

An antifoam composition was prepared in a ½ ounce vial using a microspatula to mix the ingredients which consisted of 4.0 grams of FLUID C, 0.3 gram of QUSO WR55 and 3.7 grams of a trimethylsilyl-endblocked polydimethylsiloxane having a viscosity of 20,000 cS at 25° C.

(Comparative) Example 6

The procedures of (Comparative) Example 5 were repeated wherein FLUID B was substituted for FLUID C.

Each of the antifoam compositions of Examples 1-6 was diluted with deionized water to form a dispersion having a solids content of approximately 1%, the term "solids" as used herein referring to all silicones, silica and dispersants in a given antifoam composition. This dilution allowed an accurate amount of the antifoam to be introduced into the graduated cylinder by employing a disposable syringe, which amount was adjusted so as to provide an antifoam solids content of 25 ppm (parts per million) in the foaming liquid. Knockdown and persistence results are presented in Table 2.

TABLE 2

| | Knockdown Value (Centimeters) | Persistence Value (Seconds) |
|---|---|---|
| Example | | |
| 1 | 13.5 | 1440 |
| 2 | 15.5 | 1620 |
| 3 | 13.5 | 1140 |
| (Comparative) Example | | |
| 4 | 15.0 | 480 |
| 5 | 22.0 | 0 |
| 6 | 20.0 | 30 |

It can be seen from Table 2 that the compositions of the present invention produced knockdown values at least as good as the comparison antifoams while providing much improved persistence values. Although Example 2 exhibited the best persistence value, this formulation was less desirable than Examples 2 and 3 since it separated into two phases upon standing at room temperature for less than five minutes whereas the latter materials were stable.

Examples 7-9

Compositions of the present invention, which additionally contained trimethylsilyl-endblocked polydimethylsiloxane having the viscosities (at 25° C.) indicated in Table 3, were prepared in the manner described above for Examples 1-3. These compositions were again diluted in deionized water and tested as above, the results also being shown in Table 3.

TABLE 3

| Component | Example 7 | Example 8 | Example 9 |
|---|---|---|---|
| Grams of FLUID A | 4.0 | 4.0 | 4.0 |
| Grams of FLUID B | 4.0 | 4.0 | 4.0 |
| Grams of QUSO WR55 | 0.15 | 0.15 | 0.15 |
| Grams 10 cS Polydimethylsiloxane | 0.925 | 1.85 | — |
| Grams 1,000 cS Polydimethylsiloxane | 0.925 | — | 1.85 |
| Knockdown Value (Centimeters) | 15.0 | 15.0 | 13.5 |
| Persistence Value (Seconds) | 720 | 840 | 840 |

Each of these compositions was stable at room temperature and did not phase-separate.

(Comparative) Examples 10–12

In order to further illustrate the advantage of the compositions of the present invention, the silicone defoamer reaction product was combined with two organic glycols (AE 501 and POLYGLYCOL P2000) and a nonionic surfactant (TRITON X-100), as indicated in Table 4. AE 501 (Dow Chemical Co., Midland, Mich.) is described as a glycol having the average formula $CH_2=CHCH_2(OCH_2CH_2)_{12}OH$. POLYGLYCOL P2000 (Dow Chemical Co., Midland, Mich.) is described as a polypropylene glycol having a molecular weight of about 2,000. TRITON X-100 (Rohm and Haas, Philadelphia, Pa.) is described as octylphenoxypolyethoxy(10)ethanol having an HLB value of 13.5. These compositions also contained trimethylsilyl-endblocked polydimethylsiloxane having the viscosities (at 25° C.) indicated in Table 4. They were prepared and tested in the manner described above for Examples 7–9, the test results being presented in Table 4, wherein Example 7 is again included to highlight the advantages of the compositions of the present invention.

TABLE 4

| Component | Example 7 | (Comparative) Example 10 | (Comparative) Example 11 | (Comparative) Example 12 |
|---|---|---|---|---|
| Grams of FLUID A | 4.0 | 4.0 | 4.0 | 4.0 |
| Grams of FLUID B | 4.0 | — | — | — |
| Grams of AE 501 | — | 4.0 | — | — |
| Grams of POLYGLYCOL P2000 | — | — | 4.0 | — |
| Grams of TRITON X-100 | — | — | — | 4.0 |
| Grams of QUSO WR55 | 0.15 | 0.15 | 0.15 | 0.15 |
| Grams 10 cS Polydimethylsiloxane | 0.925 | 0.925 | 0.925 | 0.925 |
| Grams 1,000 cS Polydimethylsiloxane | 0.925 | 0.925 | 0.925 | 0.925 |
| Knockdown Value (Centimeters) | 15.0 | * | * | 16.0 |
| Persistence Value (Seconds) | 720 | * | * | 120 |

*Could not be metered in accurately due to poor dispersion.

Examples 13–17

A master batch composition was prepared by mixing the following previously described ingredients for one hour using a low shear air stirrer:

| | |
|---|---|
| QUSO WR55 | 10.0 Parts |
| 10 cS Polydimethylsiloxane | 63.3 |
| 1000 cS Polydimethylsiloxane | 63.3 |
| FLUID A | 63.3 |

TABLE 5

| Example | Silicone Glycol Used | Knockdown Value (cm) | Persistence Value (sec.) |
|---|---|---|---|
| 13 | FLUID D | 17.5 | 60 |
| 14 | FLUID E | 18.5 | 30 |
| 15 | FLUID F | 17.5 | 60 |
| 16 | FLUID G | 18.0 | 30 |
| 17 | FLUID B | 16.0 | 120 |

It was observed that the composition of Example 14 was a solid at room temperature indicating that the antifoams of the present invention can be produced in solid form when the number of ethylene oxide units in the silicone glycol is sufficiently high.

Examples 18–22

A "thickened water" composition was prepared by mixing the following ingredients:

| Ingredient | Parts |
|---|---|
| METHOCEL F4M (Dow Chemical, Midland, MI) | 1.50 |
| Benzoic Acid (Preservative) | 0.10 |
| Sorbic Acid (Preservative) | 0.10 |
| Deionized Water | Balance |
| Total = | 100 Parts |

The "thickened water" was used to prepare antifoam emulsions by heating to 65°–70° C., adding the antifoam ingredients shown in Table 6 and mixing for 15 minutes. These mixtures were cooled to less than 30° C. and homogenized in a SONOLATOR (Sonic Corporation, Stratford, Conn.) at 400 psi.

TABLE 6

| Parts | Example 18 | (Comparative) Examples 19 | 20 | 21 | 22 |
|---|---|---|---|---|---|
| PDMS - 10 cS[1] | 2.775 | — | 3.08 | — | — |
| PDMS - 1000 cS[2] | 2.775 | — | 3.08 | — | — |
| FLUID A | 3.000 | 10 | 3.34 | — | — |
| QUSO WR55 | 0.450 | — | 0.50 | — | — |
| Fluid D | 10 | — | — | 10 | — |
| Water | — | — | — | 90 | — |
| "Thickened Water" from above | 81 | 90 | 90 | — | — |
| SAG Mark X[3] | — | — | — | — | 100 |

[1]Trimethylsilyl terminated polydimethylsiloxane having a viscosity of 10 cS at 25° C.
[2]Trimethylsilyl terminated polydimethylsiloxane having a viscosity of 1000 cS at 25° C.
[3]A silicone antifoam produced under U.S. Pat. No. 4,395,352 and marketed by Union Carbide Corporation, Danbury, CT (stated silicone content =10%).

Testing of the above antifoam compositions was conducted using a kraft process black liquor as described in the previous examples. The antifoam content used (and shown in Table 7) was calculated based on total silicone and silica solids and does not reflect the amounts of thickener and preservatives.

TABLE 7

| | Antifoam Conc. (ppm) | Minimum Foam Ht (cm) | TIME IN SECONDS | | | |
|---|---|---|---|---|---|---|
| | | | Time to 21 cm | Time to 26 cm | Time to 31 cm | Time to >32 cm |
| Example | | | | | | |
| 18 | 190 | 15.5 | 480 | 900 | 1500 | 1500 |
| 18a (Comparative) | 85 | 16.5 | 210 | 300 | 600 | 720 |
| Examples | | | | | | |
| 19 | 100 | 21 | 0 | 10 | >1800 | >1800 |
| 20 | 100 | 21 | 0 | 90 | 900 | 900 |
| 21 | 100 | 21 | 0 | 10 | 30 | 60 |
| 22 | 100 | 14.5 | 210 | 270 | 480 | 540 |

From Table 7 it can be seen that (Comparative Example 21), which contained silicone glycol but no FLUID A, showed essentially no activity since the minimum foam height was 21 cm (i.e., identical to the value when antifoam was injected) and the persistence value was zero. Similarly, (Comparative) Examples 19 and 20, which contained FLUID A but no silicone glycol, showed poor knockdown and persistence values. When both FLUID A and silicone glycol were combined (Example 18), a synergistic antifoaming activity was observed.

Examples 23-25

A pump test similar to that described above was used to evaluate two compositions of the present invention as antifoaming agent for an aqueous blue flexographic ink. In this evaluation, the circulating fluid containing antifoam was continuously sheared within a cup situated above the graduated cylinder by means of a high shear mixer run at 6000 r.p.m., the overflow from the cup being directed into the cylinder. Before testing, the ink was diluted with water in the ratio of 90 parts ink/10 parts water and 0.4% of the antifoam agents described in Table 8, below, were added. Testing was carried out at a fluid temperature of 30° C. and a fluid circulation rate of 1 liter/min. Foam volume in the graduated cylinder was observed as a function of time, the results being also presented in Table 8.

TABLE 8

| | Example 23 | Example 24 | Example 25 |
|---|---|---|---|
| Composition | | | |
| Parts FLUID A | 50 | 50 | 47.5 |
| Parts FLUID C | — | — | 47.5 |
| Parts FLUID H | 50 | — | — |
| Parts FLUID I | — | 50 | — |
| Parts QUSO WR55 | — | — | 5.0 |
| Test Results | | | |
| Foam Volume (ml) After: | | | |
| 10 Minutes | 80 | 100 | 105 |
| 30 Minutes | 88 | 145 | 125 |
| 60 Minutes | 76 | 155 | 38 |
| 90 Minutes | 70 | 155 | 145 |

Example 26

The following foam control composition was prepared and tested with the kraft process black liquor, according to the methods described in Examples 1-9, above.

| | Grams |
|---|---|
| PDMS - 20 cS[1] | 0.925 |
| PDMS - 1000 cS[2] | 0.925 |
| FLUID A | 4.00 |

-continued

| | Grams |
|---|---|
| FLUID B | 4.00 |
| QUSO WR55 | 1.50 |

[1] Trimethylsilyl terminated polydimethylsiloxane having a viscosity of 20 cS at 25° C.
[2] Trimethylsilyl terminated polydimethylsiloxane having a viscosity of 1000 cS at 25° C.

Antifoam concentration was again calculated based on total silicone and silica solids. In this series of experiments, SAG Mark X (Union Carbide Corporation, Danbury, Conn.) was tested alongside the above composition for comparison, the results being presented in Table 9.

TABLE 9

| Antifoam Agent | Antifoam Conc. (ppm) | Knockdown Value (cm) | Persistence Value (seconds) |
|---|---|---|---|
| Example 26 | 25 | 15.5 | 720 |
| " | 19 | 16.0 | 300 |
| " | 12 | 16.5 | 120 |
| SAG Mark X | 125 | 15.0 | 60 |
| " | 50 | 16.5 | 30 |
| " | 25 | 17.5 | 30 |

From the results of Table 9, it is seen that significantly lower antifoam concentrations of the present invention provide superior performance relative to a similar commercial product prepared according to U.S. Pat. No. 4,395,352.

Examples 27-29

Foam control compositions of the following formulations were prepared.

| | Example 27 | Example 28 | Example 29 |
|---|---|---|---|
| METHOCEL E4M | 15 grams | 15 grams | 15 grams |
| FLUID J | 0 | 10 | 20 |
| FLUID A | 47.5 | 42.75 | 38 |
| FLUID K | 47.5 | 42.75 | 38 |
| QUSO WR55 | 5 | 4.5 | 4 |
| Biocide | 1 | 1 | 1 |
| Deionized water | 884 | 884 | 884 |

The deionized water was heated to 70° C. and METHOCEL E4M (Dow Chemical Co., Midland, Mich.) was slowly added thereto while mixing to obtain a uniform dispersion. FLUID J was then added to this dispersion and thoroughly mixed therewith. To this combination, there was added a uniform mixture of FLUID A, FLUID K and QUSO WR55, according to the above table, and again thoroughly mixed therewith. Stirring was continued till the mixture had cooled to 50° C., whereupon the biocide (KATHON LX, Rohm & Haas, Philadelphia, Pa.) was added. Stirring was continued till the mixture had cooled to 30° C.

The above foam control compositions were tested according to the methods described in Examples 1-9 using two different kraft black liquors having a nonvolatile content of 7.5% and 22%, respectively. The foam control compositions were used at a concentration of 25 ppm (based on total silicone and silica solids), the test results being shown in Table 10. In addition to presenting the minimum foam height (i.e., Knockdown Value) and the time to reach 21 cm (i.e., Persistence Value), Table 10 shows the time to reach a total height (foam plus liquid) of 32 cm.

TABLE 10

| Antifoam Agent | Knockdown Value (cm) | Persistence Value (seconds) | Time to 32 cm (seconds) |
|---|---|---|---|
| Example 27 | | | |
| (7.5% liquor) | 12 | 210 | 720 |
| (22% liquor) | 15 | 90 | 420 |
| Example 28 | | | |
| (7.5% liquor) | 11 | 660 | >1800 |
| (22% liquor) | 15 | 150 | 480 |
| Example 29 | | | |
| (22% liquor) | 14.5 | 180 | >1800 |

We claim:
1. A composition consisting essentially of:
(I) a silicone defoamer reaction product prepared by reacting at a temperature of 50° C. to 300° C., and in the presence of a catalytic amount of an equilibration catalyst for promoting the reaction, said catalyst being selected from alkali metal hydroxides, alkali metal silanolates, alkali metal alkoxides, quaternary ammonium hydroxides, and quaternary ammonium silanolates,
(i) 100 parts by weight of at least one polyorganosiloxane selected from the group consisting of
(A) a polyorganosiloxane having a viscosity of about 20 to 100,000 cS at 25° C. and being expressed by the general formula $R^1_aSiO_{(4-a)/2}$ in which $R^1$ is a monovalent hydrocarbon or halogenated hydrocarbon group having 1 to 10 carbon atoms and a has an average value of 1.9 to 2.2 and
(B) a polyorganosiloxane having a viscosity of 200 to about 100 million cS at 25° C. expressed by the general formula $R^2_b(R^3O)_cSiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one $-OR^3$ group in each molecule, said $-OR^3$ group being present at least at the end of a molecular chain;
(ii) 0.5 to 20 parts by weight of at least one resinous silicon compound selected from the group consisting of
(a) an organosilicon compound of the general formula $R^4_dSiX_{4-d}$ in which $R^4$ is a monovalent hydrocarbon group having 1 to 5 carbon atoms, X is a hydrolyzable group and d has an average value of one or less,
(b) a partially hydrolyzed condensate of said compound (a),
(c) a siloxane resin consisting essentially of $(CH_3)_3SiO_{1/2}$ units and $SiO_{4/2}$ units wherein the ration of $(CH_3)_3SiO_{1/2}$ units to $SiO_{4/2}$ units is 0.4:1 to 1.2:1, and
(d) a condensate of said compound (c) with said compound (a) or (b); and
(iii) 0.5 to 30 parts by weight of a finely divided filler and
(II) from about 20 to 200 parts by weight for each 100 parts by weight of said silicone defoamer reaction product (I) of a silicone-glycol copolymer having the average general formula

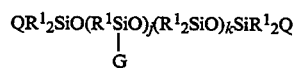

wherein $R^1$ has been previously defined, Q is $R^1$ or G, j has a value of 1 to about 25, k has a value of 0 to about 200 and G is a polyoxyalkylene group having the average structure

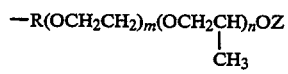

in which R is a divalent hydrocarbon group having 2 to about 20 carbon atoms, m has a value of about 7 to about 24, n has a value of 0 to about 24 and Z is selected from the group consisting of hydrogen, an alkyl radical having 1 to 6 carbon atoms and an acyl group having 2 to 6 carbon atoms.

2. The composition according to claim 1, wherein j is 1 to about 20, k is 0 to about 100 and said resinous silicon compound (ii) is selected from the group consisting of said partially hydrolyzed condensate (b), said siloxane resin (c) and said condensate (d).

3. The composition according to claim 2, wherein said silicone defoamer reaction product (I) additionally contains up to 20 parts by weight of:
(v) a polyorganosiloxane having a viscosity of 5 to 200 cS at 25° C. and being expressed by the general formula $R^6_e(R^9O)_fSiO_{(4-e-f)/2}$ in which $R^6$ is a monovalent hydrocarbon or halogenated hydrocarbon group having 1 to 10 carbon atoms, $R^9$ is hydrogen or a monovalent hydrocarbon group having 1 to 10 carbon atoms, e is from 1.9 to 2.2 and f has a sufficiently large value to give at least two $-OR^9$ groups in each molecule at the end of a molecular chain.

4. The composition according to claim 3, wherein said polyorganosiloxane (A) is a trimethylsilyl-terminated polydimethylsiloxane having a viscosity of about 350 to 15,000 cS at 25° C., said polyorganosiloxane (B) is a hydroxyl-terminated polydimethylsiloxane having a viscosity of about 1,000 to 50,000 cS at 25° C., said polyorganosiloxane (v) is a hydroxyl-terminated polydimethylsiloxane having a viscosity of about 10 to 50 cS at 25° C. and wherein $R^1$ is a methyl radical.

5. The composition according to claim 4, further comprising from about 1 to 15 parts by weight for each 100 parts by weight of said silicone defoamer reaction product (I) of:
(III) a finely divided filler.

6. The composition according to claim 5, wherein said finely divided filler (iii) and said finely divided filler (III) are each silica and said resinous silicon compound (ii) is selected from the group consisting of alkyl polysilicates in which the alkyl group has 1 to 5 carbon atoms and said siloxane resin (c).

7. The composition according to claim 6, further comprising from about 10 to 100 parts by weight for each 100 parts by weight of said silicone defoamer reaction product (I) of:
(IV) at least one polyorganosiloxane selected from the group consisting of a trimethylsilyl-terminated polydimethylsiloxane having a viscosity of about 2 to 100 cS at 25° C. and a trimethylsilyl-terminated polydimethylsiloxane having a viscosity of about 150 to 100,000 cS at 25° C.

8. The composition according to claim 4, wherein said resinous silicon compound (ii) is selected from the group consisting of alkyl polysilicates in which the alkyl group has 1 to 5 carbon atoms and said siloxane resin (c).

9. The composition according to claim 8, further comprising from about 10 to 100 parts by weight for each 100 parts by weight of said silicone defoamer reaction product (I) of:
(IV) at least one polyorganosiloxane selected from the group consisting of a trimethylsilyl-terminated polydimethylsiloxane having a viscosity of about 2 to 100 cS at 25° C. and a trimethylsilyl-terminated polydimethylsiloxane having a viscosity of about 150 to 100,000 cS at 25° C.

10. The composition according to claim 2, wherein said polyorganosiloxane (A) is a trimethylsilyl-terminated polydimethylsiloxane having a viscosity of about 350 to 15,000 cS at 25° C., said polyorganosiloxane (B) is a hydroxyl-terminated polydimethylsiloxane having a viscosity of about 1,000 to 50,000 cS at 25° C., and wherein $R^1$ is a methyl radical.

11. The composition according to claim 1, further comprising from about 1 to 15 parts by weight for each 100 parts by weight of said silicone defoamer reaction product (I) of:
(III) a finely divided filler.

12. The composition according to claim 11, wherein said finely divided filler (iii) and said finely divided filler (III) are each silica and said resinous silicon compound (ii) is selected from the group consisting of alkyl polysilicates in which the alkyl group has 1 to 5 carbon atoms and said siloxane resin (c).

13. The composition according to claim 12, wherein said silicone glycol (II) has the formula

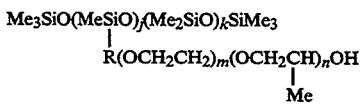

wherein Me denotes a methyl radical, R is selected from the group consisting of trimethylene and isobutylene, j has a value of 1 to 10, k has a value of 0 to 100, m is 7 to 12, n is less than or equal to m, and wherein said resinous silicon compound (ii) is selected from the group consisting of ethyl polysilicate and a siloxane resin copolymer consisting essentially of $(CH_3)_3SiO_{\frac{1}{2}}$ units and $SiO_2$ units in a molar ratio of approximately 0.75:1.

14. The composition according to claim 10, wherein said resinous silicon compound (ii) is selected from the group consisting of alkyl polysilicates in which the alkyl group has 1 to 5 carbon atoms and said siloxane resin (c), and said filler (iii) is silica.

15. In a process of controlling foam in an aqueous foaming system which includes the addition of a foam control agent to said system, the improvement comprising using as the foam control agent the composition of claim 1.

16. The process of claim 15, wherein said aqueous foaming system has a pH less than about 3.

17. The process of claim 15, wherein said aqueous foaming system is selected from the group consisting of phosphoric acid and sulphite process pulping media.

18. The process of claim 15, wherein said aqueous foaming system is a bauxite digestion medium.

19. In a process of controlling foam in an aqueous foaming system which includes the addition of a foam control agent to said system, the improvement comprising using as the foam control agent the composition of claim 2.

20. The process of claim 19, wherein said aqueous foaming system has a pH less than about 3.

21. The process of claim 19, wherein said aqueous foaming system is selected from the group consisting of phosphoric acid and sulphite proceee pulping media.

22. In a process of controlling foam in an aqueous foaming system which includes the addition of a foam control agent to said system, the improvement comprising using as the foam control agent the composition of claim 4.

23. In a process of controlling foam in an aqueous foaming system which includes the addition of a foam control agent to said system, the improvement comprising using as the foam control agent the composition of claim 7.

24. In a process of controlling foam in an aqueous foaming system which includes the addition of a foam control agent to said system, the improvement comprising using as the foam control agent the composition of claim 9.

25. In a process of controlling foam in an aqueous foaming system which includes the addition of a foam control agent to said system, the improvement comprising using as the foam control agent the composition of claim 10.

26. The process of claim 15, wherein said aqueous foaming system has a pH greater than about 12.

27. The process of claim 26, wherein said aqueous foaming system is a kraft process black liquor.

28. The process of claim 19, wherein said aqueous foaming system has a pH greater than about 12.

29. The process of claim 28, wherein said aqueous foaming system is a kraft process of black liquor.

30. In a process of controlling foam in an aqueous foaming system which includes the addition of a foam control agent to said system, the improvement comprising using as the foam control agent the composition of claim 13.

31. In a process of controlling foam in an aqueous foaming system which includes the addition of a foam control agent to said system, the improvement comprising using as the foam control agent the composition of claim 14.

32. In a process of controlling foam in a flexographic ink which includes the addition of a foam control agent to said system, the improvement comprising using as the foam control agent a composition consisting essentially of:

(I) a silicone defoamer reaction product prepared by reacting at a temperature of 50° C. to 300° C., and in the presence of a catalytic amount of an equilibration catalyst for promoting the reaction, said catalyst being selected from alkali metal hydroxides, alkali metal silanolates, alkali metal alkoxides, quaternary ammonium hydroxides, and quaternary ammonium silanolates, (i) 100 parts by weight of at least one polyorganosiloxane selected from the group consisting of (A) a polyorganosiloxane having a viscosity of about 20 to 100,000 cS at 25° C. and being expressed by the general formula $R^1{}_a SiO_{(4-a)/2}$ in which $R^1$ is a monovalent hydrocarbon or halogenated hydrocarbon group having 1 to 10 carbon atoms and a has an average value of 1.9 to 2.2 and (B) a polyorganosiloxane having a viscosity of 200 to about 100 million cS at 25° C. expressed by the general formual $R^2{}_b(R^3O)_c SiO_{(4-b-c)/2}$ in which $R^2$ is a monovalent hydrocarbon or halogenated hydocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, said —$OR^3$ group being present at least at the end of a molecular chain;

(ii) 0.5 to 20 parts by weight of at least one resinous silicon compound selected from the group consisting of (a) an organosilicon compound of the general formula $R^4{}_d SiX_{4-d}$ in which $R^4$ is a monovalent hydrocarbon group having 1 to 5 carbon atoms, X is a hydrolyzable group and d has an average value of one or less, (b) a partially hydrolyzed condensate of said compound (a), (c) a siloxane resin consisting essentially of $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, and (d) a condensate of said compound (c) with said compound (a) or (b); and (iii) 0.5 to 30 parts by weight of a finely divided filler and (II) from about 20 to 200 parts by weight for each 100 parts by weight of said silicone defoamer reaction product (I) of a silicone-glycol copolymer having the average general formula

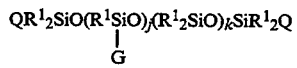

wherein $R^1$ has been previously defined, Q is $R^1$ or G, j has a value of 1 to about 150, k has a value of 0 to about 400 and G is a polyoxyalkylene group having the average structure

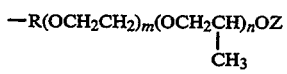

in which R is a divalent hydrocarbon group having 2 to about 20 carbon atoms, m has a value of about 4 to about 50, n has a value of 0 to about 50 and Z is selected from the group consisting of hydrogen, an alkyl radical having 1 to 6 carbon atoms and an acyl group having 2 to 6 carbon atoms.

33. A composition consisting essentially of:

(I) a silicone defoamer reaction product prepared by reacting at a temperature of 50° C. to 300° C., and in the presence of a catalytic amount of an equilibration catalyst for promoting the reaction, said catalyst being selected from alkali metal hydroxides, alkali metal silonalates, alkali metal alkoxides, quaternary ammonium hydroxides, and quaternary ammonium silanolates, 100 parts by weight of at least one polyorganosiloxane selected from the group consisting of (A) a trimethylsilyl-terminated polydimethylsiloxane having a viscosity of about 350 to 15,000 cS at 25° C. and being expressed by the general formula $R^1{}_a SiO_{(4-a)/2}$ in which $R^1$ is a methyl radical and a has an average value of 1.9 to 2.2 and (B) a hydroxyl-terminated polydimethylsiloxane having a viscosity of about 1,000 to about 50,000 cS at 25° C. expressed by the general formula $R^2{}_b(R^3O)_c SiO_{(4-b-c)/2}$ in which $R^2$ is a monovalent hydrocarbon or halogenated hydrocarbon group having 1 to 10 carbon atoms, $R^3$ is a hydrogen or a monovalent hydrocarbon group having 1 to 10 carbon atoms, b has an average value of 1.9 to 2.2 and C has a sufficiently large value to give at least one —$OR^3$ group in each molecule, said —$OR^3$ group being present at least at the end of a molecular chain;

(ii) 0.5 to 20 parts by weight of a resinous silicon compound selected from the group consisting of ethyl polysilicate and a siloxane resin copolymer consisting essentially of $(CH_3)_3SiO_{1/2}$ units and $SiO_2$ units in a molar ratio of approximately 0.75:1; and (iii) 0.5 to 30 parts by weight of silica; and (v) 0 to 20 parts by weight of hydroxyl-terminated polydimethylsiloxane having a viscosity of about 10 to 50 cS at 25° C. and being expressed by the general formula $R^6{}_e(R^9O)_f SiO_{(4-e-f)/2}$ in which $R^6$ is a monovalent hydrocarbon or halogenated hydrocarbon group having 1 to 10 carbon atoms, $R^9$ is a hydrogen or a monovalent hydrocarbon group having 1 to 10 carbon atoms, e is from 1.9 to 2.2 and f has a sufficiently large value to give at least two —$OR^9$ groups in each molecule at the end of a molecular chain; and (II) from about 20 to 200 parts by weight for each 100 parts by weight of said silicone defoamer reaction product (I) of a silicone-glycol copolymer having the average general formula

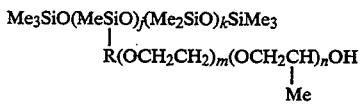

wherein Me denotes a methyl radical, R is selected from the group consisting of trimethylene and isobutylene, j has a value of 1 to 10, k has a value of 0 to 100, m is 7 to 12, n is less than or equal to m; and (III) about 1 to 15 parts by weight for each 100 parts by weight of said silicone defoamer reaction product (I) of silica.

34. A composition consisting essentially of:

(I) a silicone defoamer reaction product prepared by reacting at a temperature of 50° C. to 300° C., and in the presence of a catalytic amount of an equilibration catalyst for promoting the reaction, said catalyst being selected from alkali metal hydroxides, alkali metal silanolates, alkali metal alkoxides, quaternary ammonium hydroxides, and quaternary ammonium silanolates,
(i) 100 parts by weight of at least one polyorganosiloxane selected from the group consisting of
(A) a trimethylsilyl-terminated polydimethylsiloxane having a viscosity of asbout 350 to 15,000 cS at 25° C. and being expressed by the general formula $R^1_aSiO_{(4-a)/2}$ in which $R^1$ is a methyl radical and a has an average value of 1.9 to 2.2 and
(B) a hydroxyl-terminated polydimethylsiloxane having a viscosity of about 1,000 to about 50,000 cS at 2520 C. expressed by the general formula $R^2_b(R^3O)_cSiO_{4-b-c)/2}$ in which $R^2$ is a monovalent hydrocarbonor halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, said —$OR^3$ group being present at least at the end of a molecular chain;
(ii) 0.5 to 20 parts by weightof a resinous silicon compound selected from the group consisting of ethyl polysilicate and a siloxane resin copolymer consisting essentially of $(CH_3)_3SiO_{1/2}$ units and $SiO_2$ units in a molar ratio of approximately 0.75:1; and
(iii) 0.5 to 30 parts byweight of a finely divided filler; and
(v) 0 to 20 parts by weigt of a hydroxyl-terminated polydimethylsiloxane having a viscosityof about 10 to 50 cS at 25° C. and being expressed by the general formula $R^6_e(R^9O)_fSiO_{(4-e-e)/2}$ in which $R^6$ is a monovalent hydrocarbon or halogenated hydrocarbon grouphaving 1 to 10 carbon atoms, $R^9$ is a hydrogen or a monovalent hydrocarbon group having 1 to10 carbon atoms, e is from 1.9 to 2.2 and f has a sufficiently large value to give at least two —$OR^9$ groups in each molecule at the end of a molecular chain; and
(II) from about 20 to 200 parts by weightfor each 100 parts by weight of said silicone defoamer reaction product (I) of a silicone-glycol copolymer having the average general formula

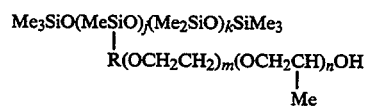

wherein Me denotes a methyl radical, R is selected from the group consisting of trimethylene and isobutylene, j has a value of 1 to 10, k has a value of 0 to 100, m is 7 to 12, n is less than or equal to m.

35. A composition consisting essentially of:
(I) a silicone defoamer reaction product prepared by reacting at a temperature of 50° C. to 300° C., and in the presence of a catalytic amount of an equilibration catalyst for promoting the reaction, said catalyst being selected from alkali metal hydroxides, alkali metal silanolates, alkali metal alkoxides, quaternary ammonium hydroxides, and quaternary ammonium silanolates,
(i) 100 parts by weight of at least one polyorganosiloxane selected from the group consisting of
(A) a trimethylsilyl-terminated polydimethylsiloxane having a viscosity of about 350 to 15,000 cS at 25° C. and being expressed by the general formula $R^1_aSiO_{(4-a)/2}$ in which $R^1$ is a methyl radical and a has an average value of 1.9 to 2.2 and
(B) a hydroxyl-terminated polydimethylsiloxane having a viscosity of about 1,000 to about 50,000 cS at 25° C. expressed by the general formula $R^2_bR^3O)_cSiO_{(4-b-)/2}$ in which $R^2$ *is a monovalent hydrocarbon or halogenated hydrocarbon group having* 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, said —$OR^3$ group being present at least at the end of a molecular chain;
(ii) 0.5 to20 parts by weight of a resinous silicon compound selected from the group consisting of ethyl polysilicate and a siloxane resin copolymer consisting essentially of $(CH_3)_3SiO_{1/2}$ *units and* $SiO_2$ units in a molar ratio of approximately 0.75:1; and
(iii) 0.5 to 30 parts by weight of silica; and
(II) from about 20 200 parts by weight for each 100 parts by weight of said silicone defoamer reaction product (I) of a silicone-glycol copolymer having the average general formula

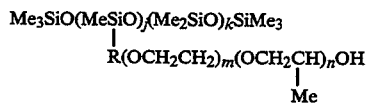

wherein Me denotes a methyl radical, R is selected from the group consisting of trimethylene and isobutylene, j has a value of 1 to 10, k has a value of 0 to 100, m is 7 to 12, n is less than or equal to m.

36. In a process of controlling foam in an aqueous foaming system which includes the addition of a foam control agent to said system, the improvement comprising using as the foam control agent the composition of claim 33.

37. The process of claim 36, wherein said aqueous foaming system has a pH greater and about 12.

38. In a process of controlling foam in an aqueous foaming system which includes the addition of a foam control agent to said system, the improvement comprising using as the foam control agent the composition of claim 34.

39. In a process of controlling foam in an aqueous foaming system which includes the addition of a form control agent to said system, the improvement comprising using as the foam control agent the composition of claim 35.

40. The process of claim 22, wherein said aqueous foaming system has a pH greater than about 12.

* * * * *